United States Patent [19]

Sagara et al.

[11] Patent Number: 5,305,375
[45] Date of Patent: Apr. 19, 1994

[54] INFORMATION SERVICE APPARATUS

[75] Inventors: Ryoji Sagara; Shigehisa Iwanaga; Akihiro Shinohara; Yuji Sumi, all of Fukuoka, Japan

[73] Assignee: Matsushita Electric Industrial Co., Ltd., Osaka, Japan

[21] Appl. No.: 757,401

[22] Filed: Sep. 10, 1991

[30] Foreign Application Priority Data

Sep. 11, 1990 [JP] Japan ................................. 2-238919

[51] Int. Cl.$^5$ ............................................. H04M 1/64
[52] U.S. Cl. .................................... 379/89; 379/88; 379/67; 379/97
[58] Field of Search .................... 379/67, 88, 89, 97

[56] References Cited

U.S. PATENT DOCUMENTS

| | | | |
|---|---|---|---|
| 4,747,127 | 5/1988 | Hansen et al. | 379/94 |
| 4,821,311 | 4/1989 | Hashimoto | 379/67 |
| 4,845,739 | 7/1989 | Katz | 379/67 |

*Primary Examiner*—James L. Dwyer
*Assistant Examiner*—Fan Tsang
*Attorney, Agent, or Firm*—Lowe, Price, LeBlanc & Becker

[57] ABSTRACT

An information service apparatus for serving one of messages stored to a caller through a telephone line, comprises: message storing unit; a table unit for storing plural tables for forming a hierarchical system for reproduction of the messages, each of the tables storing address data of a set of tablets out of the plural tables, and an address of the one of the messages, and a given code; a signal detector for detecting a data signal sent though the telephone line; and a controller response to a call for executing a first function in which the controller accesses one of the tables to determine the present scene where one of the messages is served, reads the address data of the set of the tables to next access to either of the set of the tables in accordance with the data signal by the caller, reproduces one of the messages in accordance with the read address, and detects the given code. The first function is repeatedly executed until detection of the given code and a second function that the first controller effects a given optional function in the presence of the given code. The general customer can use the optional service, such as mail box, recording, calling extension telephone in addition to the basic function of public information service.

11 Claims, 6 Drawing Sheets

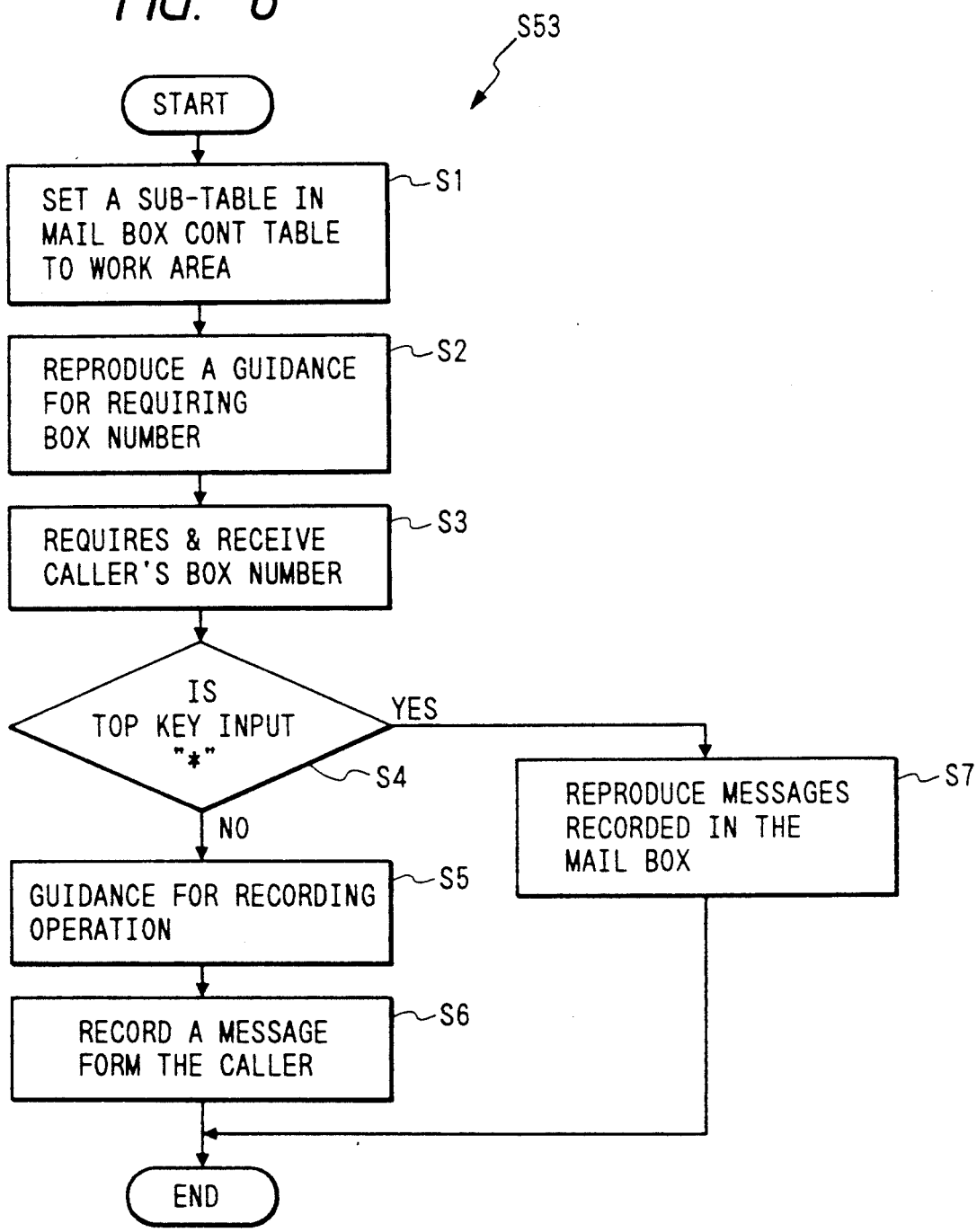

INFORMATION SERVICE APPARATUS

BACKGROUND OF THE INVENTION

1. Field of the Invention

This invention relates to an information service apparatus for serving information, and particularly to an information serving apparatus for serving information by sending a reproduced voice message and recording a received message through a telephone line.

2. Description of the Prior Art

An information serving apparatus is known which serves public information messages so stored as to form a hierarchical structure. In such information service apparatus, an a user or a manager can record guidance messages or commercial messages by its own voice therein through a telephone line. A general customer accessing the apparatus can obtain these messages in accordance with guidance of a menu selection system using push buttons of a push-phone.

However, in such prior art information service apparatus, there is a drawback that it is impossible to record a customer's message or transfer the customer's call to other extension telephone but the user can store only messages for public information service. That is, the service of the prior art information service apparatus is limited to the basic functions, so that other function such as transferring the customer's call cannot be used in its system.

SUMMARY OF THE INVENTION

The present invention has been developed in order to remove the above-described drawbacks inherent to the conventional information service apparatus.

According to the present invention there is provided a first information service apparatus for serving one of messages stored to a caller through a telephone line, comprises: a message storing unit; a table unit for storing plural tables for forming a hierarchical system for reproduction of the messages, each of the tables storing address data of a set of the tables out of the plural tables, and an address of the one of the messages, and a given code; a signal detector for detecting a data signal sent though the telephone line; and a controller responsive to a call for executing a first function in which the controller accesses one of the tables to determine the present scene where one of the messages is served, reads the address data of the set of the tables to next access to either of the set of the tables in accordance with the data signal by the caller, reproduces one of the messages in accordance with the read address, and detects the given code. The first function is repeatedly executed until detection of the given code. The controller also executes a second function in which the first control means effects a given function in the presence of the given code. The general customer can use the optional service, such as mail box, recording, calling extension telephone in addition to the basic function of public information service.

According to the present invention there is also provided a second information service apparatus as mentioned in the first information service apparatus, wherein the controller, in response to the data signal, stores the address data of the one of tables which had been accessed prior to presently accessing the one of tables to move another scene in a higher hierarchy of the hierarchical system.

According to the present invention there is also provided a third information service apparatus as mentioned in the second information service apparatus, further comprising: a second controller responsive to the data signal for storing the one of the messages sent from the telephone line in the message storing unit storing the address of the one of messages now stored, and for the given code if necessary in the one of tables now accessed the controller in the storing unit.

According to the present invention there is further provided a fourth information service apparatus as mentioned in the first information service apparatus, wherein the controller comprises: a mail box unit for effecting the given function for recording the message sent from the caller.

According to the present invention there is further provided a fifth information service apparatus as mentioned in the first information service apparatus, wherein the table unit stores a telephone number and the control means comprises: an extension telephone connection circuit responsive to the given code for connecting the telephone line to an extension telephone in accordance with the telephone number.

According to the present invention there is further provided a sixth information service apparatus as mentioned in the first information service apparatus, further comprising a connection circuit responsive to the given code for connecting the caller's telephone to an auto-switchboard unit to enable the caller to be connected to a desired extension telephone.

BRIEF DESCRIPTION OF THE DRAWINGS

The object and features of the present invention will become more readily apparent from the following detailed description taken in conjunction with the accompanying drawings in which:

FIG. 6 shows a subroutine of step shown in FIG. 2

The same or corresponding elements or parts are designated as like references throughout the drawings.

DETAILED DESCRIPTION OF THE INVENTION

Hereinbelow will be described an embodiment of this invention with reference to FIG. 1.

Figure 1:
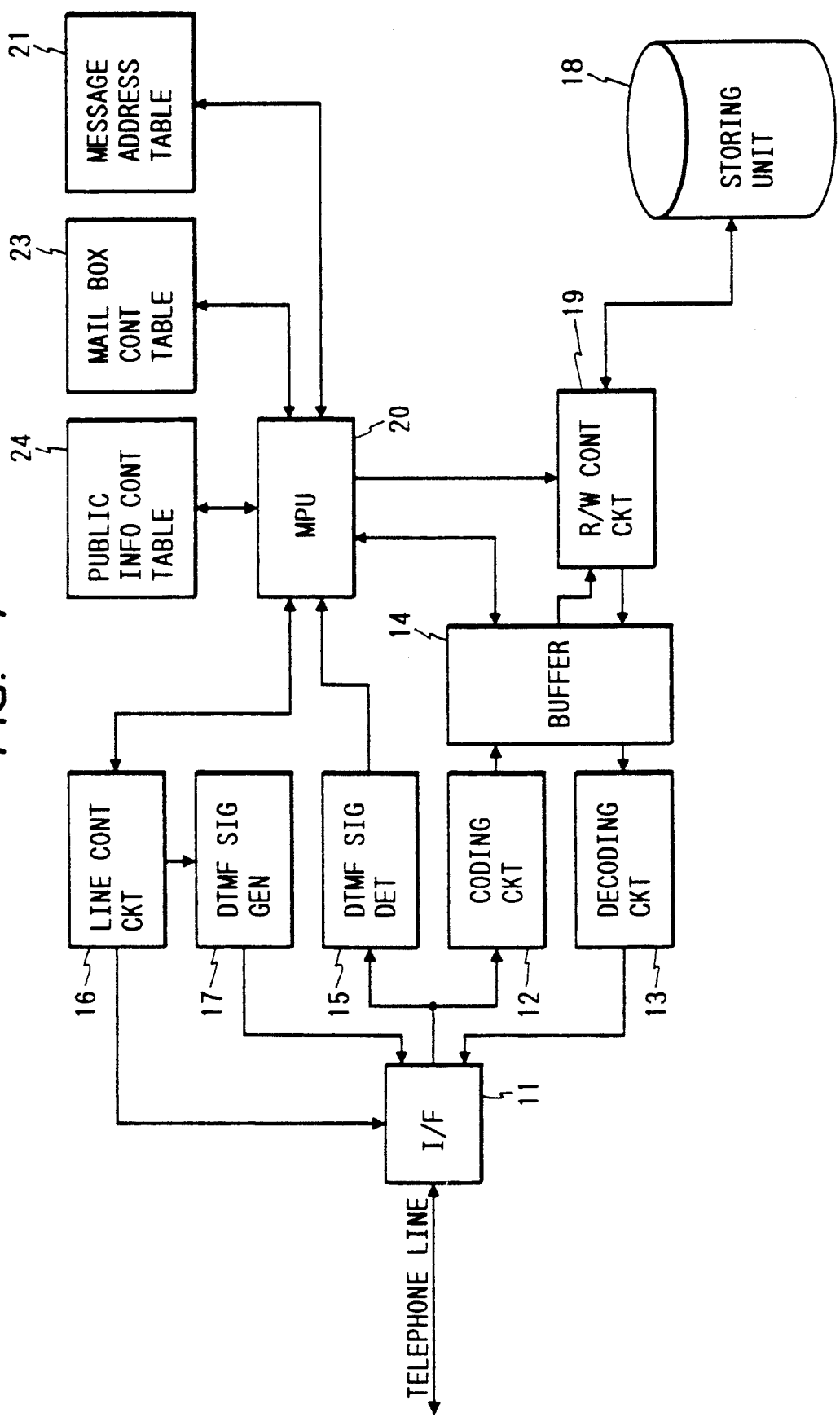
FIG. 1 is a block diagram of an information service apparatus of the embodiment of the invention.

FIG. 1 is a block diagram of an information service apparatus of the embodiment of the invention. In FIG. 1, an interface circuit 11 receives and sends a voice signal through an analog telephone line (a digital telephone line also can be utilized). An output of the interface circuit 11 is sent to a coding circuit 12 and to a DTMF (Dual Tone Multi Frequency) signal detection circuit 15. The coding circuit 12 converts the output signal of an interface circuit 11 into a digital signal and performs information compression in case of necessity. A digital voice signal from the coding circuit 12 is fed to a voice signal buffer 14. The voice signal buffer 14 stores the digital voice signal temporally in response to control of the microprocessor 20 and read/write clock signals (not shown). The voice signal buffer 14 sends the digital voice signal to a read/write control circuit 19 in response to control by a microprocessor 20, i.e., the microprocessor 20 sends an address signal and a control signal to the read/write control circuit 19.

The microprocessor 20 writes the message stored in the voice signal buffer 14 in the storing unit 18 when it detects a full condition of the voice signal buffer 14.

A voice message is reproduced from the voice message storing unit 18 by the read/write control circuit 19 in accordance with control by the microprocessor 20. The message read out is stored in the voice signal buffer 14. The voice signal buffer 14 sends the message stored therein to a decoding circuit 13 when the full condition of the voice signal buffer 14 is detected by the microprocessor 20. The decoding circuit 13 decodes the message from the voice signal buffer 14 to an analog voice signal which is sent to the interface circuit 11. The interface circuit 11 sends the reproduced message to a general customer or the owner of a box through the telephone line under control of a line control circuit 16. The box is a unit for exchanging or sending messages. The line control circuit 16 controls connection to the telephone line in response to a control signal from the microprocessor 20. The DTMF signal detection circuit 15 detects a DTMF signal sent through the telephone line from a caller's push phone, which is indicative of pushing of a push button and sends it to the microprocessor 20. The DTMF signal generation circuit 17 generates the DTMF signal and sends it to the telephone line under control of the microprocessor 20 through the line control circuit 16.

The microprocessor 20 controls the system and records a message for a public information using a public information control table 24 and a message from a general customer to the owner of the mail box using a mail box control table 23.

Figure 2:
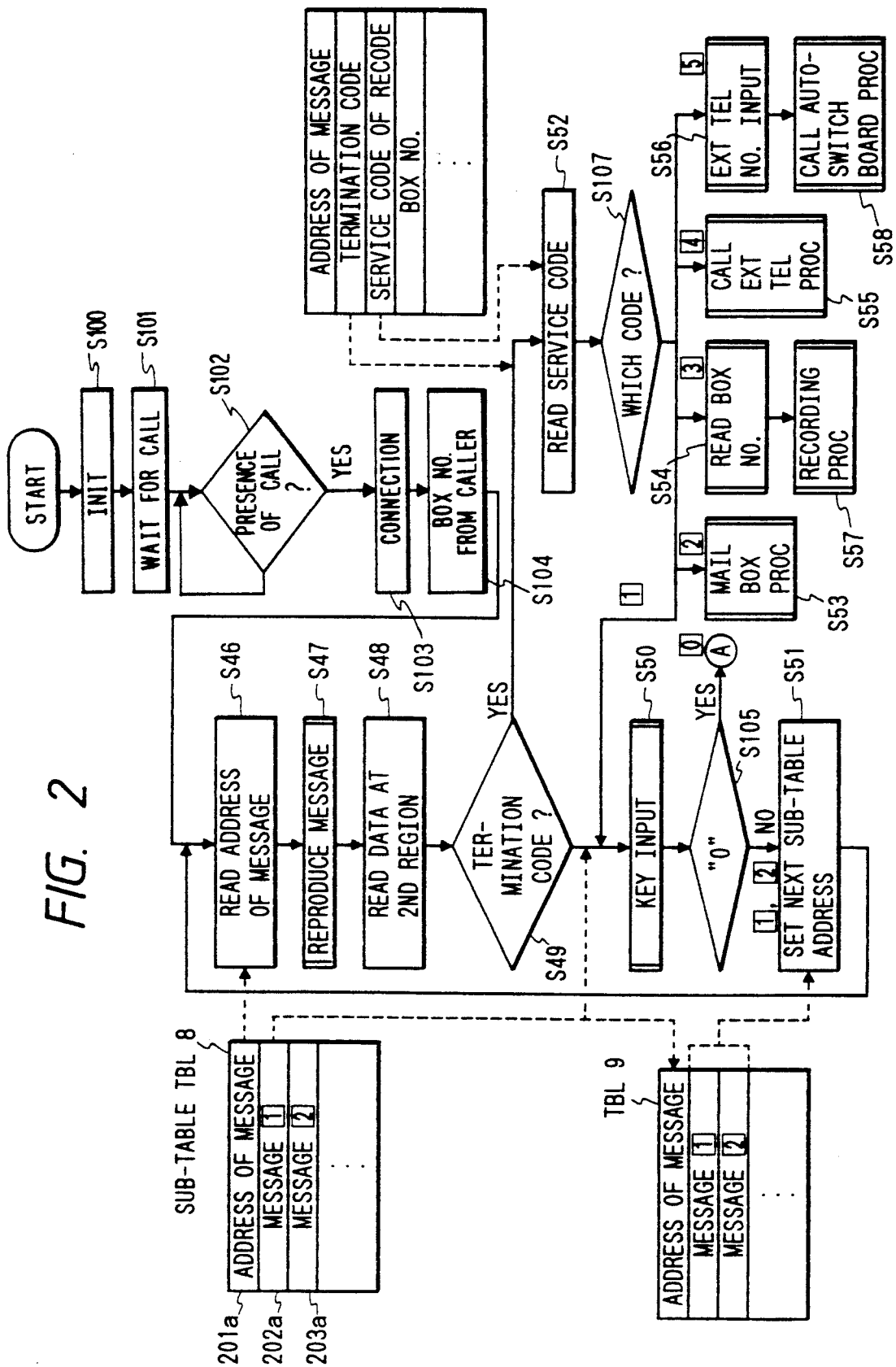
FIG. 2 shows a flow chart of the embodiment of the invention of the information service apparatus.
Figure 3:
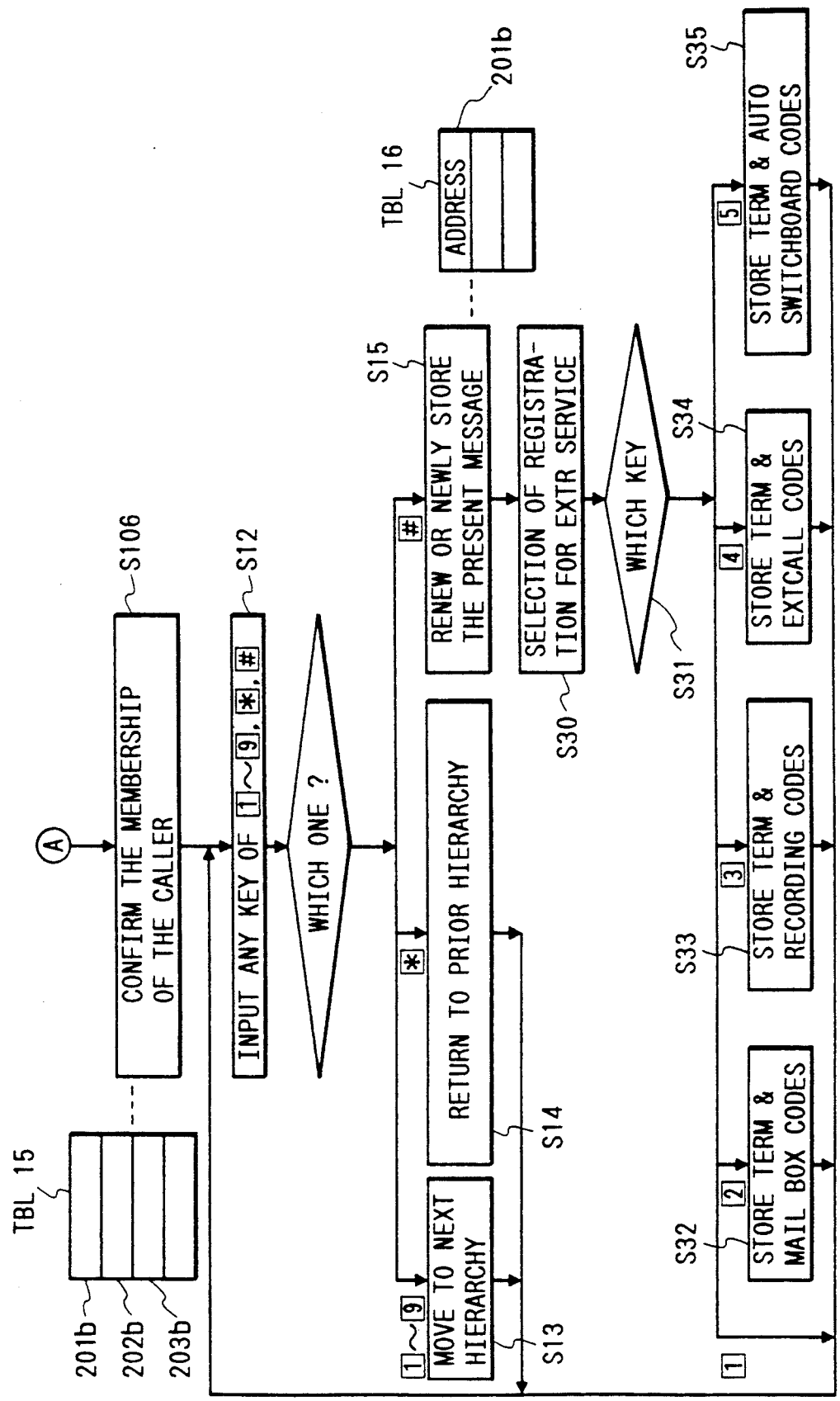
FIG. 3 shows a flow chart of the registration.
Figure 5:
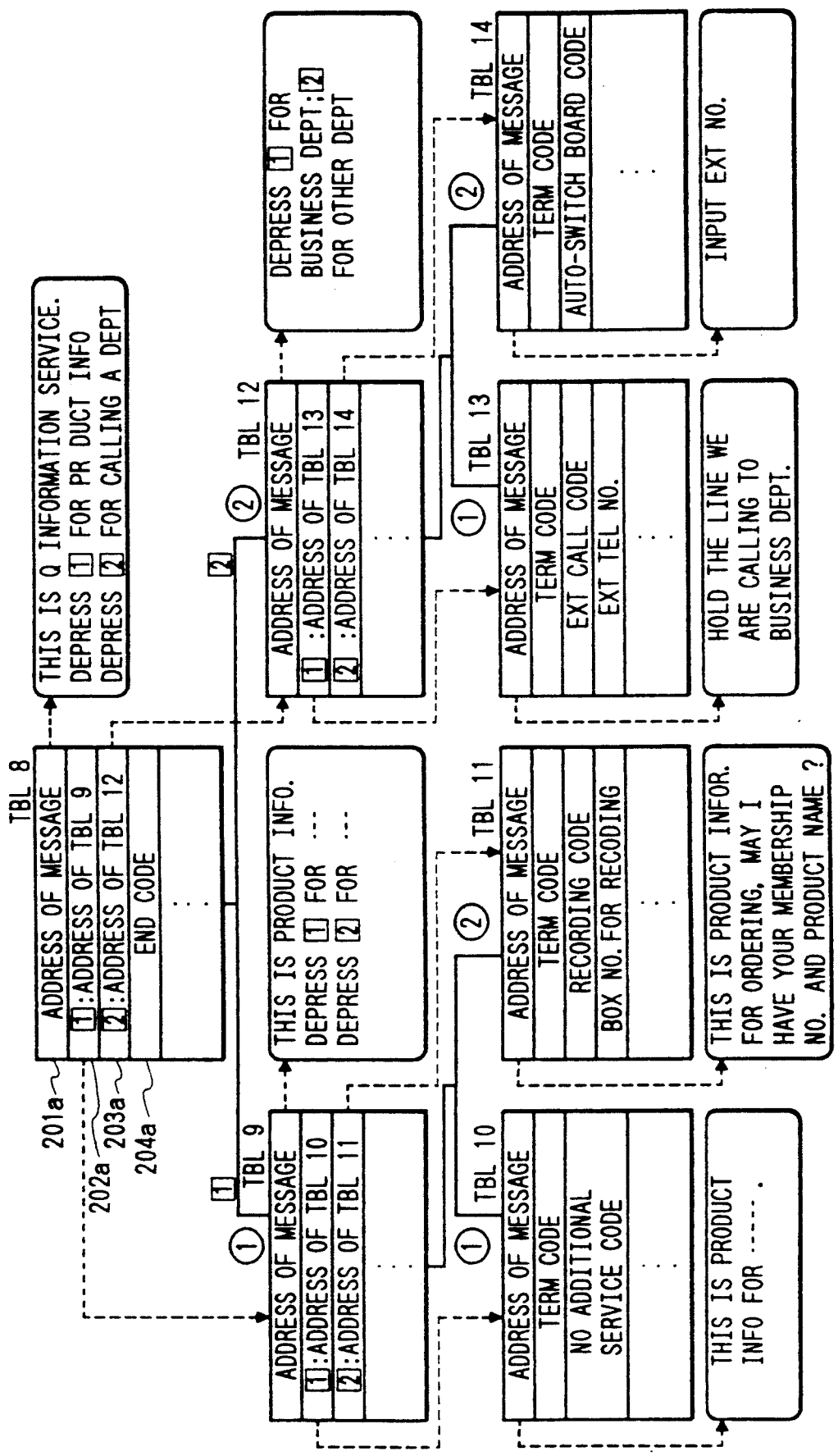
FIG. 5 shows the example of the sub-tables.

The public information control table 24 stores a plurality of sub-tables TBL 8 to TBL 16 shown in FIGS. 2, 3, and 5 at every box. Each of the sub-tables stores an address of message at a first region 201, and at a second region 202a is stored on an address of another sub-table to be selectively accessed next in accordance with input of the caller. At first, the microprocessor 20 reproduces guidance and menu messages stored in the storing unit 18 with reference to an address of the message stored in the first region 201a of a sub-table TBL 8 set in the work area thereof. Alternatively, a pointer can be also used to indicate which sub-table is presently accessed. The actual address of the message is obtained using a message address table 21. Then, the microprocessor 20 sets either of sub-tables TBL 9 and TBL 12 to the work area in accordance with caller's selection by depressing a push button of his telephone with reference to addresses of sub-tables TBL 9 and TBL 12 stored in the second and third regions of the presently loaded sub-table TBL 8.

Hereinbelow will be described operation of the information service apparatus with reference to FIGS. 2 and 3.

FIGS. 2 and 3 show flow charts of the embodiment of the invention of the information service apparatus.

At first, registration of messages will be described. FIG. 3 shows the flow chart of the registration. The processing of the registration starts at a terminal "A" which is branched off from step S105 shown in FIG. 2 mentioned later.

In FIG. 3, processing starts at step S106 where the microprocessor 20 confirms the membership of the caller by requiring and confirms a membership number after reproducing a guide message stored in the storing unit 18 with reference to a sub-table TBL 15. In the following step S12, the microprocessor 20 waits key input of the caller's telephone. If the key input is any of "1" to "9", the microprocessor 20 changes a scene to next or lower hierarchy, that is, it sets a next sub-table to its work area. If the key input is "*", processing proceeds to step S14. In step S14, the microprocessor 20 returns to the prior hierarchy, that is, the microprocessor 20 sets the sub-table used prior to the present sub-table. That is, the microprocessor 20 stores an address of the sub-table accessed prior to the presently accessing sub-table and uses it to return to the prior sub-table. Processing after steps S13 and S14 returns to step S12. If the key input is "#", processing proceeds to step S15. In step S15, the microprocessor 20 records a message from the owner of the box after an announcement of start of recording which is also stored in the storing unit 18. A first region 201d of sub-table TBL 16 indicative of the message formerly recorded in step 15 is rewritten. In the case of the first registration, or increase in a hierarchy, the microprocessor 20 generates a new sub-table such that the new sub-table indicates a relation to other existing sub-tables. In the following step S30, the microprocessor 20 waits key input. If the key input is "1", processing returns to step S12 directly. If the key input is "2", processing proceeds to step S32. If the key input is "3", processing proceeds to step S33. If the key input is "4", processing proceeds to step S34. If the key input is "5", processing proceeds to step S35. In step 32, the microprocessor 20 stores a termination code and a mail box code in the second and third regions of the sub-table TBL 16 respectively. In step S33, the microprocessor 20 stores a termination code and a recording code in the second and third regions of the sub-table TBL 11 respectively. In step S34, the microprocessor 20 stores a termination code and an extension call code in the second and third regions of the sub-table TBL 13. In addition to this, the microprocessor 20 requires and stores a desired extension telephone number. In step S35, the microprocessor 20 stores a termination code and an auto-switchboard code in the second and third regions of the sub-table TBL 14.

Operation of the registration will be described more specifically with reference to an example of registration procedure with reference to FIG. 4.

Figure 4:
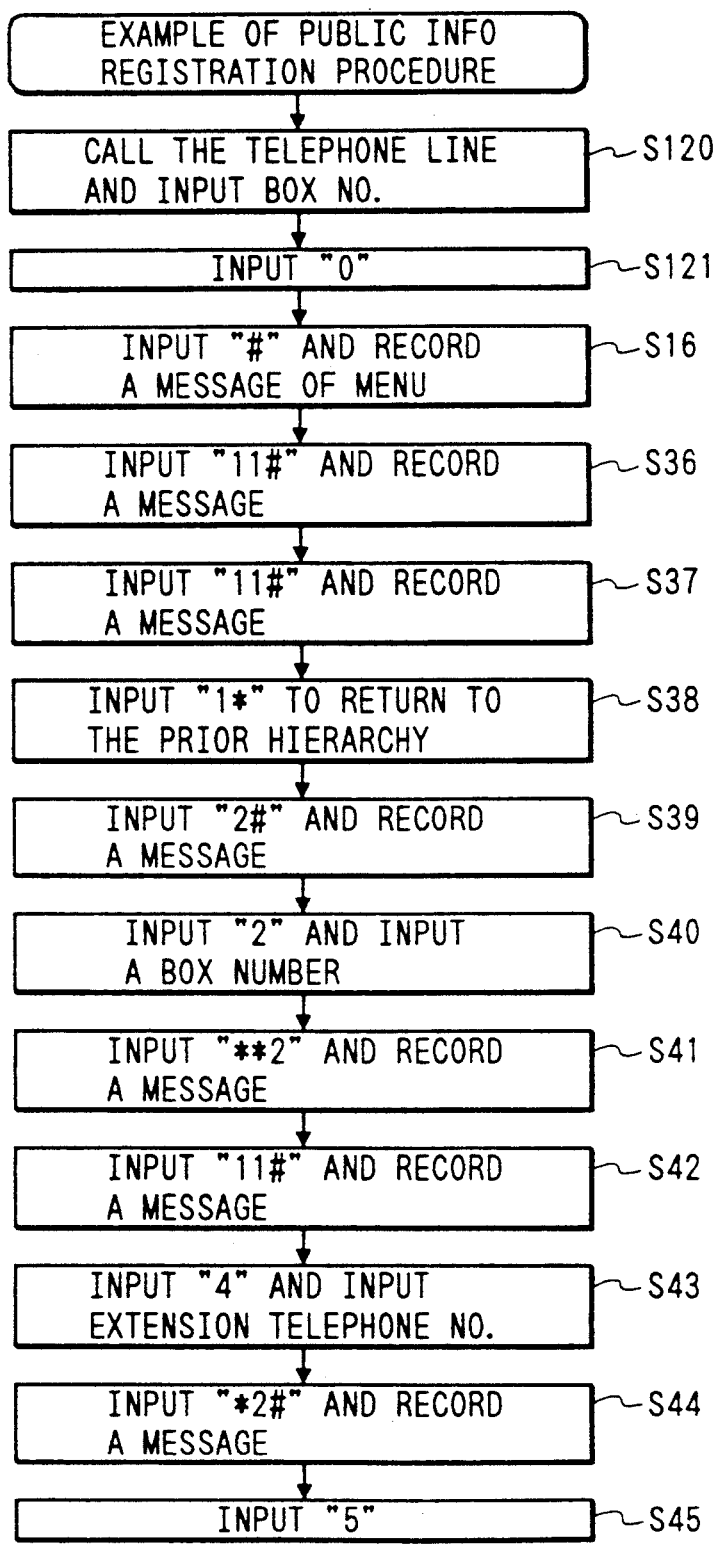
FIG. 4 shows an example of registration procedure.

In FIG. 4, the owner or manager of the box calls the telephone line and inputs his own box number in step S120, for example, "5115". In the following step S120, the owner inputs "0" to enter the registration processing. The owner builds up the hierarchical system of messages by repeating operation of movement between hierarchies and of recording a message. In the succeeding step S16, the owner inputs "#" to record a message of a menu. Processing proceeds from step S15 to step S30 shown in FIG. 3.

Input of a numeral number means of a push button moving to the next hierarchy; input of "*", returning to the prior hierarchy; and input of "#", recording of a new message or rewriting of a message over a recorded message. After recording a message in procedure step S120, procedure enters registration of additional service. The information service apparatus inquires the owner which additional service is required for. For example, "input '1' if no additional service is required; input '2' if the mail box service is registered; input '3' is for recording service; '4', for calling a given extension telephone; '5', for calling the exchange terminal."

In the following procedure step S36, the owner inputs "11#" and records a message. Processing proceeds from step S31 to step S15 through step S12 which steps are shown in FIG. 3. Procedure step S37 shown in FIG. 4 is for recording a message of the lower hierarchy than recorded in procedure step S36. In the following procedure step S38, the owner inputs "1*" to return to the prior hierarchy. Processing proceeds in order of steps S30, S31, S12, and S14. In procedure step S39, the owner inputs "2#" and records a message. Processing proceeds in order of steps S13, S12 and S15. That is, the owner records a message of another branch of the hierarchical tree. In the following procedure step S40, the owner input "2" and a box number. This means the code of mail box processing is recorded in the present sub-table in mpu's processing step S33 shown in FIG. 3. In each of steps S41 and S42 a message of other branch of the hierarchical tree is inputted. In procedure step S43, the owner inputs "4" and an input extension telephone number. This means the code of calling an input extension telephone and its number are stored in a sub-table TBL 13. In the following procedure step S44, the owner inputs "*2#" and record a message for guidance of calling an automatic switchboard. In the succeeding procedure step S45, the owner inputs "5" to store a code of calling a switchboard in the present sub-table.

FIG. 5 shows the example of the sub-tables TBL 8-TBL 14 formed through the above-mentioned procedure of registration. These sub-tables TBL8-TBL9 are stored in the public information control table 24. In procedure step S120 in FIG. 4, the owner call the information service apparatus. In the succeeding procedure step S36, the owner records a message, "This is information service. Please, input '1' for new product guide, '2' for calling a department of our company." This makes the sub-table TBL 8 to be stored as shown. The sub-table TBL 8 stores an address of the message in the storing unit 18 at first region 201a. The second region 202a stores an address of the sub-table TBL 9 for moving to a scene when the sub-table TBL 9 is used. The third region 203a stores the address of the sub-table TBL 12 for moving to a scene when the sub-table TBL 12 is used. The fourth region 204a stores an end code indicative of end of the recording of data in the sub-table TBL 8. Input of "1" in the scene at which the sub-table TBL 8 is accessed or activated, i.e., this sub-table TBL 8 is loaded in the work area of the microprocessor 20, changes the scene to that at which the sub-table TBL 9 is activated. The sub-table TBL 10 stores an address of a message "This is product information—." at the first region thereof and a termination code indicative of the end of the branch of the hierarchical tree at the second region thereof. At the third region thereof TBL 10 stores a service termination code indicative of that no additional service is provided. The sub-table TBL 11 stores: at the first region thereof, an address of a message, "This is product information. For ordering, may I have your membership number and a desired product name?"; at the second region, the termination code; at the third region, a recording code for executing an additional function of recording; and at the fourth region, a box number for recording general customer's answer as to this question. The sub-table TBL 13 stores: an address of message, "Hold the line. We are calling the business department." at the first region thereof; at the second region, the termination code; at the third region, an extension call code for executing an additional function of calling an extension telephone; and at the fourth region, an extension telephone number. The sub-table TBL 14 stores: an address of message, "Input a desired extension number" at the first region thereof; at the second region, the termination code; and at the third region, an auto-switchboard code for executing an additional function of calling an auto-switchboard. As described, in the information service apparatus of the invention, the mail box, recording, calling extension telephone, calling auto-switch board services are provided. However, there are various services which can be provided in addition to these services.

As mentioned above, registration of messages are carried out using the telephone line. However, it is also possible to effect registration as follows:

The public information control table 24 comprises a read only memory (not shown). The read only memory and the storing unit 18, for example, a hard disc apparatus (not shown), are replaced with another read only memory and another storing unit where a new set of address data of sub-tables and new set of messages are recorded in advance. Moreover, messages can be registered using a microphone (not shown) without telephone line when registering.

Hereinbelow will be described operation of general customer's hearing processing.

In FIG. 2, processing starts at step S100. In step S100, initialization is made and a sub-table TBL 8 of an initial message is set to the work area of microprocessor 20. In the following steps S101 and S102, the microprocessor 20 waits for call. In response to a call, the microprocessor 20 makes connection with the telephone line in the following step S103 by controlling the interface circuit 11 through the line control circuit 16. In the following step S104, the microprocessor 20 requires and receives a box number wherein the box is indicative of a unit of messages having one hierarchical structure. In the succeeding step S46, the microprocessor 20 reads an address of a message indicated in the sub-table TBL 8 presently loaded in the work area. In the following step S47, the microprocessor 20 reproduces the message by controlling the read/write control circuit 19 and the voice signal buffer 14 using the address of the message. The message is "This is Q information service. Depress '1' for product information, '2' for calling a desired department." That is, the message requires key input "1" or "2". In the following step S48, the microprocessor 20 reads data at the second region of the sub-table TBL 8. In the following step S49, a decision is made as to whether the read data is a termination code. If the answer is YES, processing proceeds to step S52. If NO, processing proceeds to step S50. In step 50, the microprocessor 20 waits key input. In the following step S105, a decision is made as to whether the key input is "0". The input of key "0" is secret for general customers but is known by the owner of the box. If the answer is YES, processing proceeds to the registration processing mentioned earlier.

If the key input is "1", the microprocessor 20 sets the next sub-table TBL 9 to its work area with reference the sub-table TBL 8. Then, processing returns to step S46 and a loop including step S46 to S51 until the termination code is detected in step S49 or key "0" is detected in step S105 in order to serve a messages having the hierarchical structure.

In step S49, if the code is the termination code, processing proceeds to step S52. In step S52, the microprocessor 20 reads a service code at a third region of the sub-table TBL 11, TBL 13, or TBL 14. In the following step S107, a decision is made as to which code is stored. If the code is a mail box code, processing proceed to step S53. If the code is the recording code, processing proceeds to step S54. In step S54, the microprocessor 20 reads data at the fourth region of the sub-table TBL 11. In the succeeding step S57, the microprocessor 20 executes recording processing. In the step S107, if the code is an extension call code, processing proceed to step S55. The microprocessor 20 reads data at the fourth region of the sub-table TBL 13 and send a flash to the PBX to place the caller's line in hold state by sending a command signal to the line control circuit 16. That is, the line control circuit 16 causes the interface circuit 11 to produce and send a "flash" to the PBX (not shown) connected to the information service apparatus. The flash is a momentary disconnection of the telephone line. The PBX causes the caller's line to be in hold state. Then, the microprocessor 20 sends the extension telephone number to the PBX using the line control circuit 20 and the DTMF signal generation circuit 17. Then, the microprocessor 20 disconnects the information apparatus from the telephone line so that the caller's line is connected to the extension telephone. This extension telephone transfer operation is similar to that of the conventional manual operation extension telephone system which is commonly used in general offices. In the step S107, if the code is an auto-switchboard code, processing proceed to step S56. The microprocessor 20 requires input of an extension telephone number to the caller using the message indicated by the sub-table 14. When the microprocessor 20 receives the key input of the extension telephone number, it sends a flash to the PBX to cause the caller's line to be placed in a hold state by sending the command signal to the line control circuit 16. That is, the line control circuit 16 causes the interface circuit 11 to produce and send the flash to the PBX connected to the information service apparatus. The PBX causes the caller's line to be in hold state. Then, the microprocessor 20 sends the extension telephone number of the auto-switchboard to the PBX using the line control circuit 16 and the DTMF signal generation circuit 17. Then, the microprocessor 20 sends the received extension telephone number to the auto-switchboard and then disconnects the telephone line so that the caller's line is connected to the desired extension telephone.

Hereinbelow will be described operation of the mail box function with reference to FIG. 6.

This flow chart of FIG. 6 shows a subroutine of step S53. Processing starts at step S1. In step S1, microprocessor 20 sets a sub-table in the mail box control table 23 to its work area. The mail box control table 23 includes plural sub-tables and each of the sub tables includes first, second, third regions for storing address of messages, address data of sub-tables accessed next and other code or data as the same as the public information control table 24.

In the following step S2, the microprocessor 20 reproduces a message for requiring a box number by reading the message with reference to an address recorded in the sub-table now loaded in the work area. The message is "Input box number." In the succeeding step S3, the microprocessor 20 receives the desired box number. In that step, the microprocessor 20 requires and receives caller's box number.

In the following step S4, a decision is made as to whether the caller is the owner of the box now accessed by checking that the top key input is "*". If the answer is NO, processing proceeds to step S6. In step S6, the microprocessor 20 reproduces a guidance for start of recording. In the following step S6, the microprocessor 20 records a message of the caller. In step S5, the answer is YES, that is, the caller is the owner of the box, processing proceeds to step S7. In step S7, the microprocessor 20 reproduces the recorded messages in the owner's box.

What is claimed is:

1. An information service apparatus for serving one of a plurality of stored voice messages to a caller through a telephone line, comprising:
   (a) message storing means for storing said plurality of voice messages;
   (b) voice message reproducing means for reproducing one of said plurality of voice messages;
   (c) table means for storing plural tables, for forming a hierarchical system, each of said plural tables including at least one of a plurality of table addresses to be accessed next, a message address of said one of said plurality of voice messages, and a selected one of a plurality of predetermined service codes;
   (d) dial signal detection means for detecting a dial signal sent through the telephone line; and
   (e) first control means responsive to a call from the caller for entering said hierarchical system and changing a scene in said hierarchical system in response to each detection of the dial signal by:
      i) accessing one of said plural tables selected in accordance with the detected dial signal with reference to a table address of a previously accessed one of said plural tables; and
      ii) reading one of said plurality of voice messages in accordance with a message address of the currently accessed one of said plural tables and supplying said read one of said plurality of voice messages to the caller through said voice message reproducing means, said first control means detecting said one of said plurality of predetermined service codes stored in said currently accessed one of said plural tables; and
   (f) second control means responsive to said first control means and, in the presence of said selected one of said plurality of predetermined service codes in said currently accessed one of said plural tables, selecting one of a plurality of predetermined services in accordance with said selected one of said plurality of predetermined service codes detected by said first control means and effecting said selected one of said plurality of predetermined services.

2. An information service apparatus claimed in claim 1, wherein the dial signal includes a dual tone multi-frequency signal component and said dial signal detection means comprises a dual tone multi-frequency signal detection circuit for detecting said dual tone multi-frequency signal component.

3. An information service apparatus claimed in claim 1, wherein each of said plural tables further stores data in association with said selected one of said plurality of predetermined service codes.

4. An information service apparatus claimed in claim 3, wherein said data stored in each of said plural tables comprises an external telephone number.

5. An information service apparatus claimed in claim 1, further comprising:

(a) first guidance sending means for sending a first vocal guidance to said caller, said first vocal guidance being provided for requesting sending of said dial signal for selecting either of a mail box recording mode or a mail box reproducing mode;

(b) second guidance sending means for sending a second vocal guidance to said caller, said second vocal guidance requesting sending of a personal message of said caller through the telephone line;

(c) personal message storing means for storing a personal voice message sent from said caller in response to said sending of said second vocal guidance; and (d) personal message reproducing means for reproducing a stored personal voice message, said second control means effecting said selected one of said plural services by said second guidance sending means, said personal message storing means, and said personal message reproducing means, wherein said personal message storing means stores said personal voice message when the detected dial signal indicates said mail box recording mode and said personal message reproducing means reproduces said stored personal voice message when the detected dial signal indicates said mail box reproducing mode.

6. An information service apparatus claimed in claim 4, further comprising calling signal generation means for generating a calling signal for calling one of a plurality of extension telephones connected to the same private branch exchange to which said information service apparatus is connected, by using said extension telephone number and said currently accessed one of said plural tables, said second control means effecting said selected one of said plurality of services by operating said calling means.

7. An information service apparatus claimed in claim 1, further comprising:

(a) guidance sending means for sending a vocal guidance to said caller, said vocal guidance requesting a further transmission of said dial signal; and (b) calling signal generation means for generating a calling signal for calling one of a plurality of extension telephones connected to the same private branch exchange to which said information service apparatus is connected, by using said further transmitted dial signal.

8. An information service apparatus claimed in claim 1, wherein said first control means further comprises:

(a) detection means for detecting whether or not the dial signal detected by said dial signal detection means indicates a registering mode and for producing a registering mode signal responsively thereto; and (b) third control means responsive to said registering mode signal for entering said hierarchical system and changing said scene in said hierarchical system in response to each detection of said dial signal, said third control means further having registering command detection means for detecting whether or not each said detected dial signal indicates a registering command, said third control means responsive to said registering command for renewing said one of said voice messages stored in said message storing means with reference to said address of said currently accessed one of said plural tables with a voice message sent from said caller.

9. An information service apparatus claimed in claim 8, wherein said third control means further comprises:
service code detection means for detecting whether each said detected dial signal indicates said service code, said third control means being further responsive to said detected service code for storing said service code in said currently accessed one of said plural tables.

10. An information service apparatus claimed in claim 1, wherein said first control means operates for changing the scene in said hierarchical system in response to the detected dial signals remotely generated by the caller on a remote telephone and transmitted to the apparatus on the telephone line,
thereby facilitating operation free of requirement for inputting input signals to an input terminal of the apparatus.

11. An information service apparatus claimed in claim 5, wherein said personal message storing means stores said personal voice message and said personal message reproducing means reproduces said stored personal voice message each in response to the detected dial signals remotely generated by the caller on a remote telephone and transmitted to the apparatus on the telephone line,
thereby facilitating operation free of requirement for inputting input signals to an input terminal of the apparatus.

* * * * *